(12) United States Patent
Beam et al.

(10) Patent No.: US 7,913,431 B1
(45) Date of Patent: Mar. 29, 2011

(54) GROUND CLEARING APPARATUS

(76) Inventors: Roger D. Beam, Albion, NY (US);
Richard H. Beam, Albion, NY (US);
Michael M. Beam, Amherst, NY (US)

(*) Notice: Subject to any disclaimer, the term of this patent is extended or adjusted under 35 U.S.C. 154(b) by 0 days.

(21) Appl. No.: 12/776,125

(22) Filed: May 7, 2010

Related U.S. Application Data (60) Provisional application No. 61/176,867, filed on May 8, 2009.

(51) Int. Cl.
*E02F 3/96* (2006.01)
*B66C 21/00* (2006.01)

(52) U.S. Cl. .......................................... 37/406; 414/726

(58) Field of Classification Search ............ 37/403–410, 37/466, 468; 172/298; 414/697, 715, 721–729, 414/732, 741
See application file for complete search history.

(56) References Cited

U.S. PATENT DOCUMENTS

| | | | |
|---|---|---|---|
| 3,595,416 | A | 7/1971 | Perrotti |
| 4,372,063 | A | 2/1983 | Work |
| 4,467,876 | A | 8/1984 | Gaule |
| 4,517,755 | A | 5/1985 | Nicholson |
| 4,607,441 | A | 8/1986 | Norton |
| 5,797,461 | A | 8/1998 | Noble |

*Primary Examiner* — Robert E Pezzuto
(74) *Attorney, Agent, or Firm* — Patent Innovations LLC; John M. Hammond (57) ABSTRACT

A ground clearing apparatus comprising a box member comprised of a framework having an upper edge, first and second side edges, and a lower edge. A plurality of base teeth protrude downwardly from the lower edge. The apparatus further comprises a grapple including a first grapple arm hingeably attached to the box member, a second grapple arm hingeably attached to the box member, and a cross member joined to a distal ends of the first and second grapple arms. A plurality of grapple teeth extend outwardly from the cross member. The grapple is movable from a closed position in which the grapple teeth are interspersed with the base teeth, to an open position in which the grapple teeth are separated from the base teeth.

17 Claims, 11 Drawing Sheets

GROUND CLEARING APPARATUS

CROSS-REFERENCE TO RELATED PATENT APPLICATIONS

This application claims priority to U.S. provisional patent application Ser. No. 61/176,867, filed May 8, 2009, the disclosure of which is incorporated herein by reference.

BACKGROUND

1. Field of the Invention

Ground clearing apparatus that is attachable to a loader, bulldozer, or tractor, and includes a combination of ripping, raking, and gripping elements for extracting and separating rocks, and roots, stumps, and other vegetation components from soil.

2. Description of Related Art

The clearing of rocks and/or vegetation from various landscapes requires powerful, robust machinery. This is typically accomplished through the use of bulldozers, loaders, or tractors, to which is attached one or more modular implements which can be used to perform a ground clearing function. The type of ground clearing functions may vary, depending upon the intended use of the cleared ground. Common uses of newly cleared ground are farming, or commercial, industrial, or residential development.

Oftentimes, the ground to be cleared will be a forest or a brush covered area. The objects to be cleared from the ground will thus include trees, stumps, and brush above the ground surface, and rocks and roots of widely varying size beneath the ground surface. To clear such ground, the ground clearing functions may include knocking over whole trees and stumps, dislodging the trees, stumps, and brush from the ground, ripping the roots from the ground and bringing them to the surface, dislodging rocks from the ground and bringing them to the surface, raking the ground to select and separate rocks and roots of a certain size threshold from the ground while leaving soil and smaller size debris behind, and picking up the rocks, trees, stumps, etc., and removing them to a remote location.

As currently practiced, ground clearing operations require a variety of implements that are attachable to a bulldozer, loader, or tractor. Each implement may have a particular function. For example, a blade may be used as a ground scraping device, and an object pushing device used for knocking trees and stumps over, and pushing them along the ground. A ripper having a few large teeth may be used to break-up sod allowing it to pass through the teeth thereof, while ripping roots and rocks from the ground. A rake may be used to separate rocks and roots of a certain size threshold from the ground. One or more rakes may be required, with each successive rake having an increased number of teeth, in order to achieve a range of rock and root size separations. A grapple may be used to pick up large objects, such as trees, stumps, rocks, and clusters of brush, and to transport them to another location, or drop them into a dump truck box for removal from the site.

Maintaining an inventory of such a range of implements is expensive, as is transporting all of these implements to a job site when they are needed. During a ground clearing operation, the numerous changeovers from one implement to another that are required to perform the full range of ground clearing operations is labor intensive, and therefore also costly. What is needed is a single implement which can be attached to a bulldozer, loader, or tractor, and which can perform multiple ground clearing operations.

SUMMARY

The problem of performing multiple ground clearing operations with a single attachable implement is solved by a ground clearing apparatus comprising a box member comprised of a framework having a perimeter comprised of an upper edge, first and second side edges, and a lower edge; a plurality of base teeth protruding downwardly from the lower edge; a first hinge ear joined to the framework proximate to the upper edge and first side edge; and a second hinge ear joined to the framework proximate to the upper edge and second side edge; and a grapple comprised of a first grapple arm hingeably attached to the first hinge ear of the box member; a second grapple arm hingeably attached to the second hinge ear of the box member; and a cross member joined to a distal end of the first grapple arm and to a distal end of the second grapple arm, and a plurality of grapple teeth extending outwardly from the cross member, the grapple being movable from a closed position in which the cross member is proximate to the lower edge of the box member to an open position. When the grapple is in the closed position, the grapple teeth are interspersed with the base teeth, and the apparatus may be used as a fine rake. When the grapple is in the open position, only the base teeth are in contact with the ground to be cleared, and the apparatus may be used as a coarse rake.

The box member is comprised of a forward surface bounded by the perimeter and may include a plurality of openings therethrough. The forward surface may be comprised of a grating formed in the framework, wherein the plurality of openings form a grid in the forward surface. The number of grapple teeth may be substantially equal to the number of base teeth. In such an instance, the grapple teeth may be substantially equally spaced between the base teeth when the grapple is in the closed position. The number of grapple teeth may be about two times or three times the number of base teeth, or more. The grapple may be further comprised of a first linear actuator operatively connected to the first grapple arm and to the box member, and a second linear actuator operatively connected to the second grapple arm and to the box member.

In a further embodiment, the ground clearing apparatus may include a pair of first and second support arms, each of first and second support arms comprising a proximal portion and a distal portion. The proximal portion of the first support arm is a first member of a first four member box linkage, the first four member box linkage further comprising second, third, and fourth members, wherein the first support arm is hingeably attached at a proximal end thereof to the second member of the first box linkage, which comprises a first fixed length frame member; the third member of the first box linkage is comprised of a first variable length linear actuator hingeably attached at a proximal end thereof to the second member; and the fourth member of the first box linkage is comprised of a first fixed length bar member hingeably attached at a lower end thereof to a distal end of the proximal portion of the first support arm, and hingeably attached at a central region thereof to a distal end of the third member of the first box linkage. The proximal portion of the second support arm is a first member of a second four member box linkage, the second four member box linkage further comprising second, third, and fourth members, wherein the second support arm is hingeably attached at a proximal end thereof to the second member of the second box linkage, which comprises a second fixed length frame member; the third member of the second box linkage is comprised of a second variable length linear actuator hingeably attached at a proximal end thereof to the second member of the second box linkage; and the fourth member of the second box linkage is comprised of a second fixed length bar member hingeably attached at a lower end thereof to a distal end of the proximal portion of the second support arm, and hingeably attached at a central region thereof to a distal end of the third member of the second box linkage. The distal portion of the first support arm is a first member of a third four member box linkage, the third four member box linkage further comprising second, third, and fourth members, wherein the first support arm is hingeably attached at a distal end thereof to a lower region of the box member, the box member forming the second member of the third box linkage; the third member of the third box linkage is comprised of a third fixed length bar member hingeably attached at a distal end thereof to an upper region of the box member; and the fourth member of the third box linkage is comprised of the fourth member of the first box linkage hingeably attached at an upper end thereof to a proximal end of the third member of the third box linkage. The distal portion of the second support arm is a first member of a fourth four member box linkage, the fourth four member box linkage further comprising second, third, and fourth members, wherein the second support arm is hingeably attached at a distal end thereof to the lower region of the box member, the box member forming the second member of the fourth box linkage; the third member of the fourth box linkage is comprised of a fourth fixed length bar member hingeably attached at a distal end thereof to the upper region of the box member; and the fourth member of the fourth box linkage is comprised of the fourth member of the second box linkage hingeably attached at an upper end thereof to a proximal end of the third member of the fourth box linkage. The first and second fixed length frame members may be joined to one of a tractor, a loader, a bulldozer, and a skid-steer.

BRIEF DESCRIPTION OF THE DRAWINGS

The present disclosure will be provided with reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

In accordance with the present disclosure, a ground clearing apparatus is provided comprising a box member and a grapple. The box member and the grapple may each include teeth for raking of ground to be cleared. The apparatus may further include first and second support arms, which may be operatively connected to a tractor, a loader, a bulldozer, or a skid-steer. The apparatus is useful in performing the ground clearing functions of knocking over trees and stumps, dislodging trees, stumps, and brush from the ground, ripping roots and rocks from the ground and bringing them to the surface, breaking up sod and busting clumps of sod/soil, and raking the ground to select and separate rocks and roots from the ground, and picking up rocks, trees, stumps, etc., and removing them to a remote location. In other words, the apparatus can perform substantially all of the major ground clearing functions, leaving cleared ground in a state that is ready for farming, or commercial, industrial, or residential development.

Figure 1:
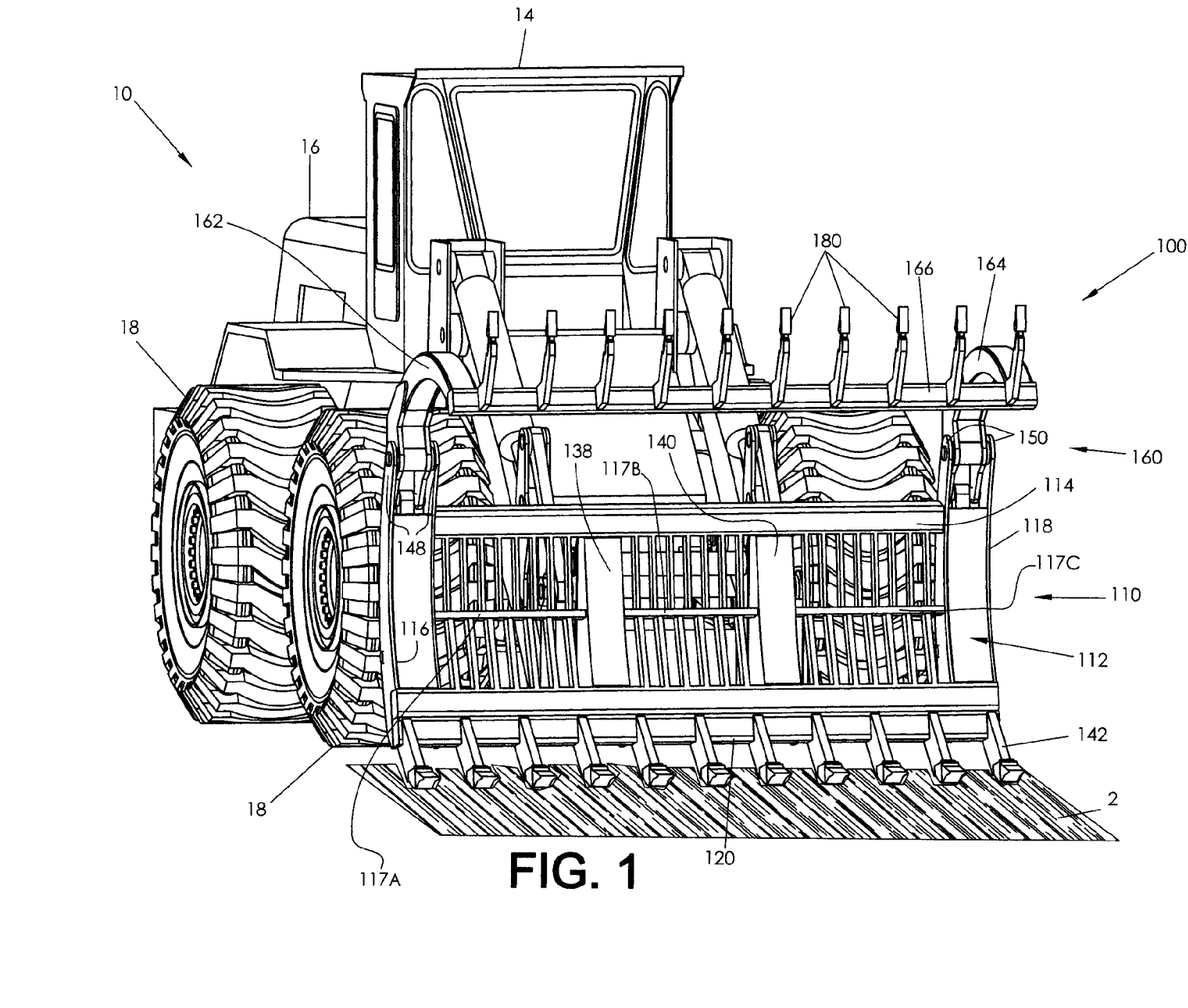
FIG. 1 is a front perspective view of a ground clearing apparatus of the present disclosure attached to a loader, and having the grapple of the apparatus in the open or raised position.
Figure 2:
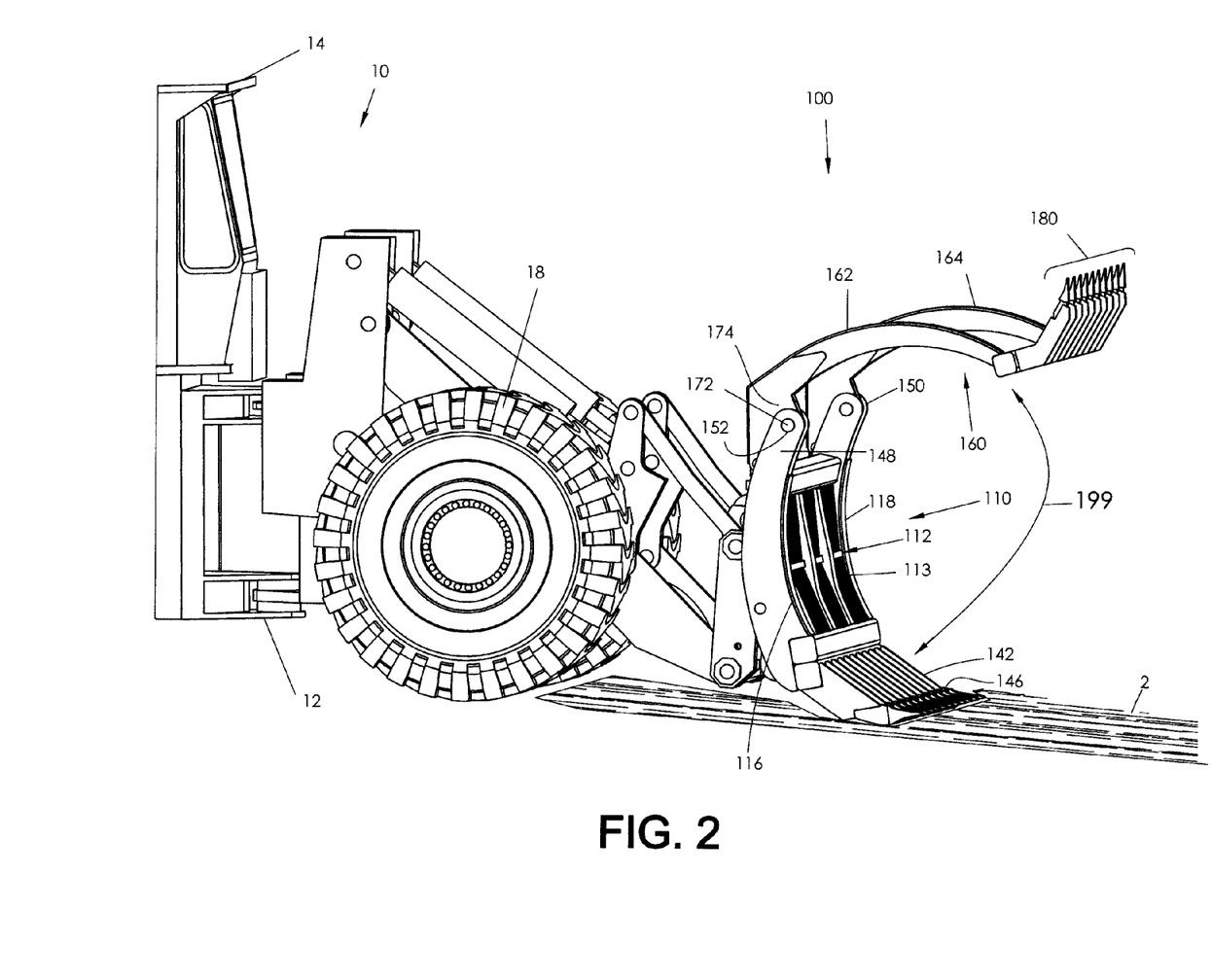
FIG. 2 is a side perspective view of the ground clearing apparatus of FIG. 1 attached to the loader.

Embodiments of the ground clearing apparatus will now be described, and are best understood with reference to FIGS. 1-5B. Referring first to FIGS. 1 and 2, the ground clearing apparatus 100 is shown operatively connected to a loader 10. The details of the connection of the apparatus 100 to the loader 10, and the operation of the apparatus 100 will be described subsequently herein. First, however, details of the apparatus 100 will be described with reference also to FIGS. 3A, 3B, 5A, and 5B.

The ground clearing apparatus 100 is comprised of a box member 110 and a grapple 160. The box member 110 is comprised of a framework 112 having a perimeter comprised of an upper edge 114, first and second side edges 116 and 118, and a lower edge 120. In performing ground clearing operations, the box member 110 is subjected to high stresses, impacts, and shock loads, and is thus made of high strength materials, such as e.g., structural steel members. The box member 110 is preferably of welded construction. In one embodiment, the upper edge 114 and lower edge 120 may be formed by respective heavy wall square steel tubing members 122 and 124. The first side edge 116 may be formed by a first outer plate 126, which is joined to a first face plate 128, which in turn is joined to a first inner plate 130 to form a first high-strength C-shaped channel structure. In like manner, the second side edge 118 may be formed by a second outer plate 132, which is joined to a second face plate 134, which in turn is joined to a second inner plate 136 to form a second C-shaped channel structure. The box member 110 may be further comprised of structural columns 138 and 140 formed of plates, tubing, or other structural sections and joined to the upper and lower tubing members 122 and 124. These columns 138 and 140 provide additional strength and rigidity to the box member 110, and also provide attachment locations for connection of the apparatus to a loader or other machine. It will be apparent that other structural members and arrangements could be used to form the box member 110.

The box member 110 is further comprised of a plurality of base teeth 142 protruding downwardly from the lower edge 120. The base teeth 142 may be disposed at substantially regular intervals along the lower edge 120, and may be used in the coarse raking of ground during a ground clearing operation. The base teeth may be welded to a second lower tubing member 144, which in turn is welded to the first lower tubing member 124. The base teeth 142 are subjected to considerable impacts, shocks, and abrasion during a ground clearing operation, and may be subject to wear and/or breakage during such operation. In one embodiment, the base teeth 142 are of two piece construction, and are each comprised of a mounting bar 146, and a removable tooth member 147, which may be joined to the mounting bar 146 by one or more suitable fasteners (not shown).

The box member 110 is further comprised of a first hinge ear 148 joined to the framework 112 proximate to the upper edge 114 and first side edge 116 thereof; and a second hinge ear 150 joined to the framework 112 proximate to the upper edge 114 and second side edge 118 thereof. In one embodiment, the first hinge ear 148 may be formed by extending the first outer plate 126 and the first inner plate 130 upwardly beyond the upper edge 114 of the box member 110. In like manner, the second hinge ear 150 may be formed by extending the second outer plate 132 and the second inner plate 136 upwardly beyond the upper edge 114 of the box member 110.

With reference again to FIGS. 1-5B, the grapple 160 of the ground clearing apparatus 100 will now be described. The grapple 160 is comprised of a first grapple arm 162 hingeably attached to the first hinge ear 148 of the box member 110, a second grapple arm 164 hingeably attached to the second hinge ear 150 of the box member 110, and a cross member 166 joined to a distal end 168 of the first grapple arm 162 and to a distal end 170 of the second grapple arm 164. The first grapple arm 162 is hingeably attached to the first hinge ear 148 by a pin 172 disposed in holes 152 in the first hinge ear 148 and in a hole provided in the proximal end 174 of the first grapple arm 162. In like manner, the second grapple arm 164 is hingeably attached to the second hinge ear 150 by a pin 176 disposed in holes 154 in the second hinge ear 150 and in a hole provided in the proximal end 178 of the second grapple arm 164. By virtue of the hingeable attachment of the grapple 160 to the box member 110, the grapple 160 is movable from an open position in which the cross member 166 is raised, to a closed position in which the cross member 166 is proximate to the lower edge 120 of the box member 110, as indicated by arcuate arrow 199.

The grapple 160 is further comprised of a plurality of grapple teeth 180 extending outwardly from the cross member 166. These grapple teeth 180 serve to provide the apparatus 100 with fine raking capability, which is best understood with reference to FIGS. 4, 5A, and 5B. When the grapple 160 is in the closed position, the grapple teeth 180 are interspersed with the base teeth 142, and the apparatus 100 may be used as a fine rake. When the grapple 160 is in the open position as shown in FIGS. 1, 2, 3A, and 3B, only the base teeth 142 are in contact with the ground 2 to be cleared, and the apparatus 100 may be used as a coarse rake. The number of grapple teeth 180 may be substantially equal to the number of base teeth 142, with grapple teeth 180 alternating with base teeth 142 when the grapple 160 is in the closed position. If the apparatus 100 is constructed with the grapple teeth 180 being outermost, there will be N base teeth, and N+1 grapple teeth. If the apparatus 100 is constructed with the base teeth 142 being outermost, there will be N base teeth, and N−1 grapple teeth. In either instance, the grapple teeth 180 are preferably substantially equally spaced between the base teeth 142 when the grapple is in the closed position. In another embodiment (not shown), the number of grapple teeth 180 may be about two times the number of base teeth 142. In other words, two grapple teeth 180 may be spaced between each pair of blade teeth 142. In another embodiment (not shown), the number of grapple teeth 180 may be about three times the number of base teeth 142, i.e., three grapple teeth 180 may be spaced between each pair of blade teeth 142. Other arrangements of grapple teeth 180 and blade teeth 142 may be used.

The grapple teeth 180 are also subjected to considerable impacts, shocks, and abrasion during a ground clearing operation, and may be subject to wear and/or breakage during such operation. In one embodiment, the grapple teeth 180 are of two piece construction, and are each comprised of a mounting bar 182, and a removable tooth member 184, which may be joined to the mounting bar 182 by one or more suitable fasteners (not shown).

Figures 3A, 3B:
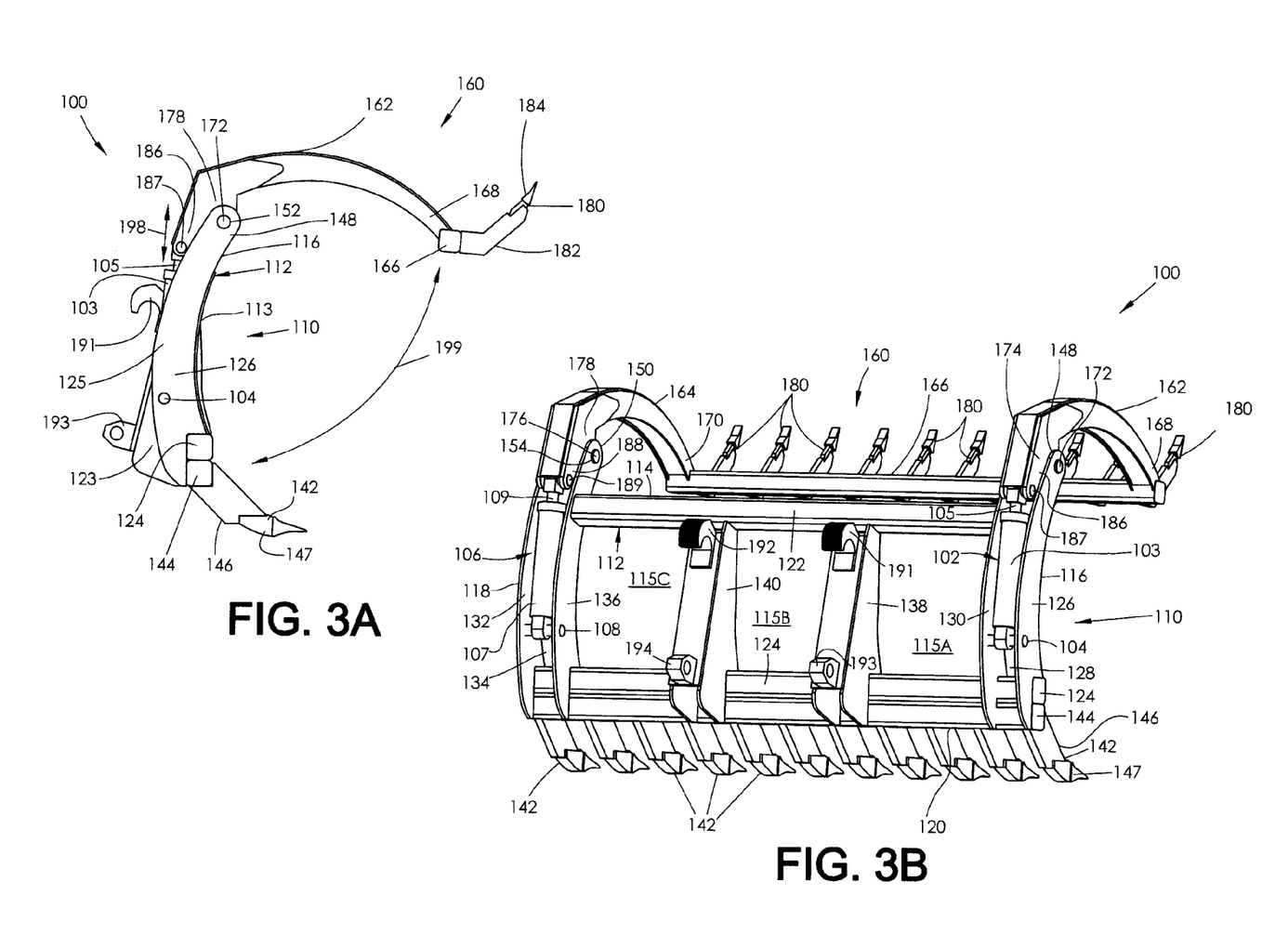
FIG. 3A is a side elevation view of another embodiment of a ground clearing apparatus of the present disclosure with the grapple of the apparatus in the open position.
FIG. 3B is a rear perspective view of the ground clearing apparatus of FIG. 3A.
Figure 4:
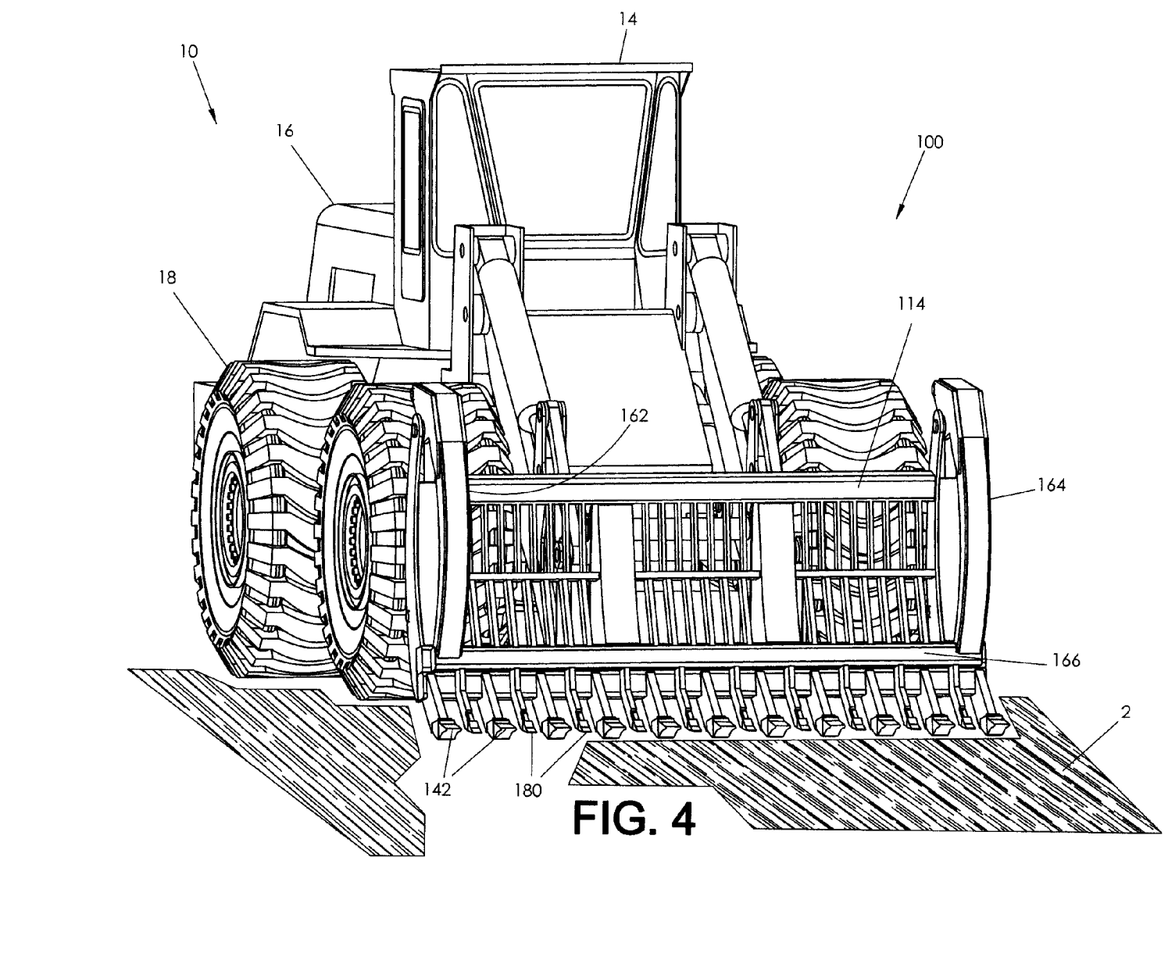
FIG. 4 is a front perspective view of the ground clearing apparatus of FIG. 1, with the grapple of the apparatus in the closed or lowered position.
Figures 5A, 5B:
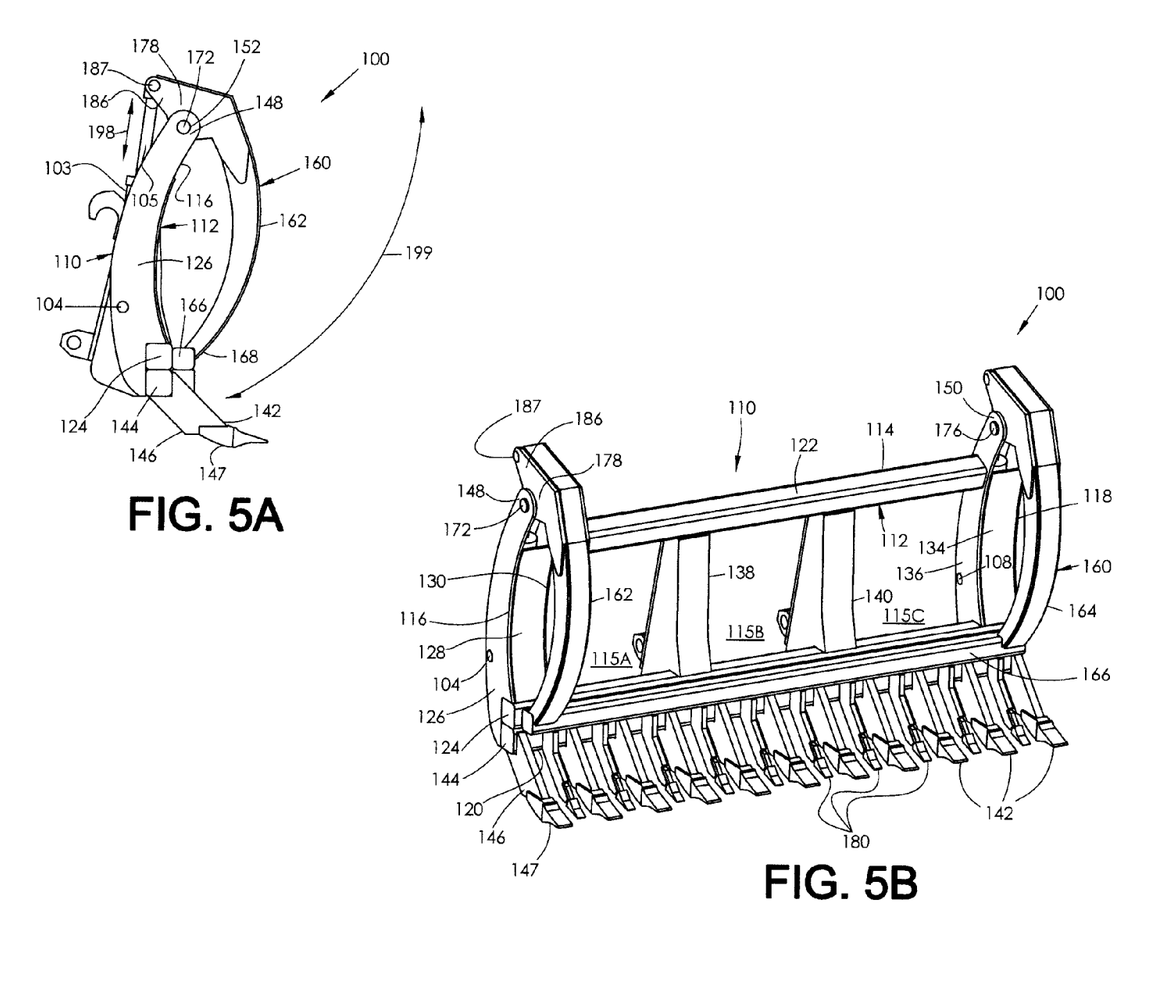
FIG. 5A is a side elevation view of the ground clearing apparatus of FIG. 4 with the grapple of the apparatus in the closed position.
FIG. 5B is a front perspective view of the ground clearing apparatus of FIG. 5A.

To move the grapple 160 between the closed position and the open position, the grapple 160 may be further comprised of a first linear actuator operatively connected to the first grapple arm 162 and to the box member 110, and a second linear actuator operatively connected to the second grapple arm 164 and to the box member 110. The linear actuators are preferably hydraulic cylinders, although other linear actuators may be suitable, depending upon the machine to which the apparatus 100 is connected. Referring in particular to FIGS. 3A, 3B, and 5A, a first hydraulic cylinder 102 is disposed in the channel formed by first outer plate 126, first face plate 128, and first inner plate 130. The body 103 of the first hydraulic cylinder 102 is operatively connected to the first outer plate 126 and the first inner plate 130 by a pin 104, and the piston 105 of the first hydraulic cylinder 102 is operatively connected to a first drive ear 186 of the first grapple arm 162 by a pin 187. In like manner, a second hydraulic cylinder 106 is disposed in the channel formed by second outer plate 132, second face plate 134, and second inner plate 136. The body 107 of the second hydraulic cylinder 106 is operatively connected to the second outer plate 132 and the second inner plate 136 by a pin 108, and the piston 109 of the second hydraulic cylinder 106 is operatively connected to a second drive ear 188 of the second grapple arm 164 by a pin 189.

In a further embodiment (not shown), the first and second grapple arms 162 and 164 are not connected to each other by the cross member 166. In such an instance, the first and second grapple arms 162 and 164 function as independent grapple arms, and may include inwardly directed cantilevered support arms for the grapple teeth 180. Stated in another way with reference to the grapple 160 of FIGS. 1-5B, the cross member 166 of the grapple 160 is cut in its middle region, with no physical connection provided between the first and second grapple arms 162 and 164. The resulting independent grapple arms 162 and 164 may be provided with independent linear actuators to operate grapple arms 162 and 164 separately.

The box member 110 is further comprised of a forward surface bounded by the perimeter of the framework 112. In one embodiment (not shown), the forward surface may be formed of a solid plate of material, or multiple plates of material that are joined together. Alternatively, the forward surface may include a plurality of openings therethrough. Referring to FIGS. 3A, 3B, 5A, and 5B, the forward surface 113 is provided with three openings 115A, 115B, and 115C therethrough between the columns 138 and 140, and the first and second inner plates 130 and 136. In an alternative embodiment shown in FIGS. 1, 2, and 4, the forward surface 113 is comprised of gratings 117A, 117B, and 117C formed in the framework, wherein the plurality of openings in the gratings 117A/117B/117C form a grid in the forward surface 113. These gratings permit an operator of the apparatus 100 to see through box member 110, thereby providing visibility to the operator, while still containing debris and permitting the debris to be pushed into a pile and grappled.

The forward surface of the box member 110 and the grapple arms 162 and 164 are preferably curved, and form opposed concave surfaces with respect to each other. In that manner, when the grapple 160 is in the lowered position, a volume having an elliptical cross section is formed. This volume contains the various objects to be picked up and transported by the apparatus 100 when it is used for a grappling operation.

Figure 6:
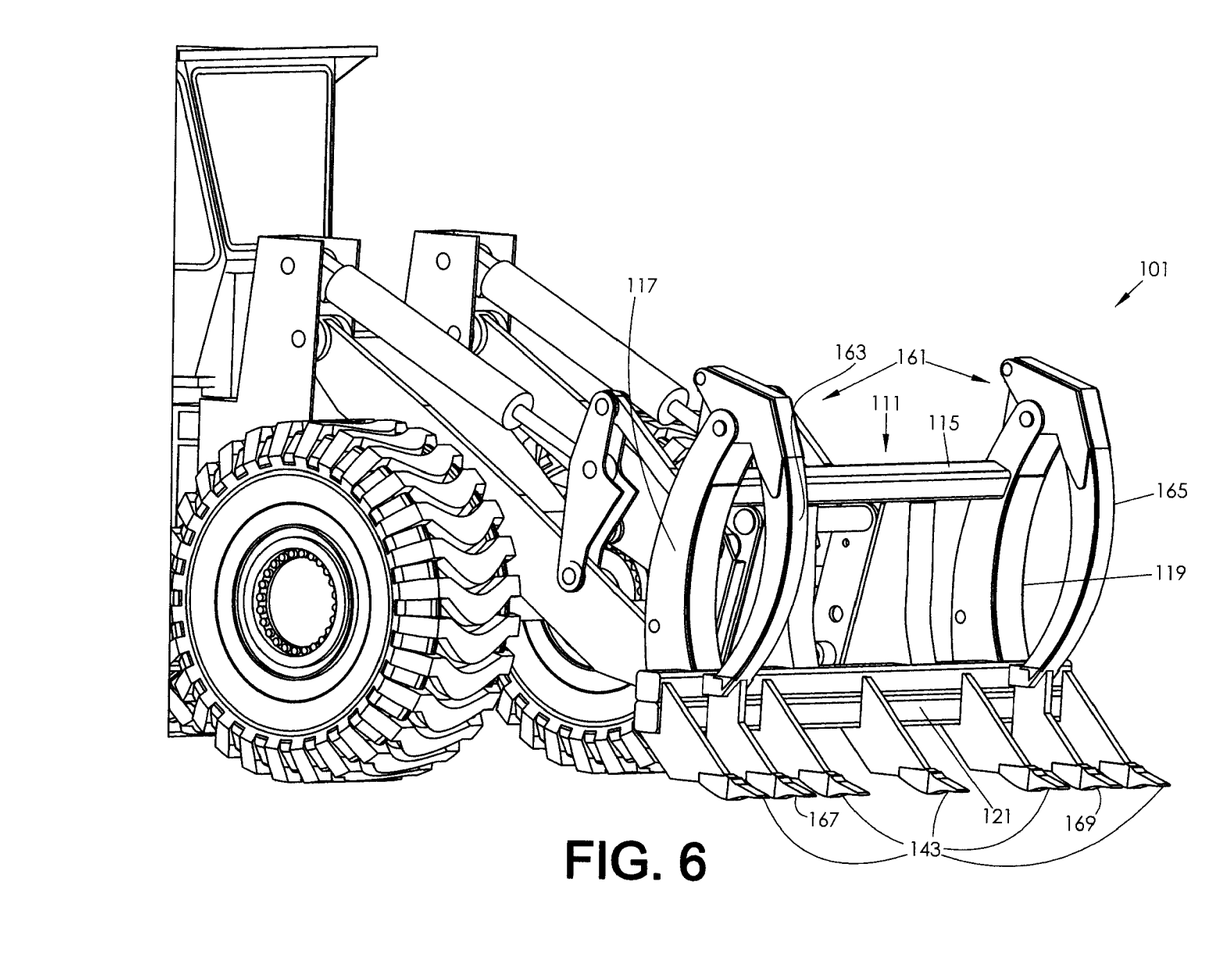
FIG. 6 is a front perspective view of another embodiment of a ground clearing apparatus of the present disclosure with the grapple of the apparatus in the closed position.

FIG. 6 is a front perspective view of another embodiment of a ground clearing apparatus 101 of the present disclosure including a box member 111 and a grapple 161, which is shown in the closed position. The apparatus 101 is similar to the apparatus 100 of FIGS. 1-5B, and is comprised of a framework comprised of an upper member 115, first and second side members 117 and 119, and a lower member 121. The box member 111 is further comprised of a plurality of base teeth 143 protruding downwardly from the lower member 121. The base teeth 143 differ from the base teeth 142 of apparatus 100 in that they are disposed at wider intervals along the lower member 121. The apparatus 101 further differs from the apparatus 100 in that the grapple 161 is comprised of separate grapple arms 163 and 165, which are not joined by a cross member. With the grapple 161 not having a cross member, when a large irregular shaped object having a thick end, such as a root ball of a tree, and a thin end, such as the trunk of the tree, is grappled, the respective grapple arms will close and clamp down on the respective parts of the object. The apparatus 101 is thus more suited to grappling irregular shaped objects, and is also of lighter weight. In a further embodiment, grapple arms 163 and 165 may be provided with independently controlled hydraulic cylinders, thereby enabling the apparatus 101 to pick up two objects, such as a stump and a rock, in separate operations.

Grapple 161 also has only two grapple teeth 167 and 169, which are disposed between adjacent blade teeth 143. In a further embodiment, the grapple arms 163 and 165 may further include inwardly directed extensions (not shown), each including an additional grapple tooth (not shown), such that the central tooth of the blade teeth 143 has a pair of grapple teeth on each side of it.

The apparatus 101 is more effective than apparatus 100 for performing very coarse raking, as well as for acting as a ripper. The teeth 143 of apparatus 101 are spaced further apart and are stronger, thereby enabling apparatus 101 to be more effective in breaking up sod and heavy soil, such as clay. The wider spacing of teeth 143 allows soil to pass through teeth 143 when large rocks, stumps, roots, and trees are ripped from the surface of the ground 2.

Figure 8:
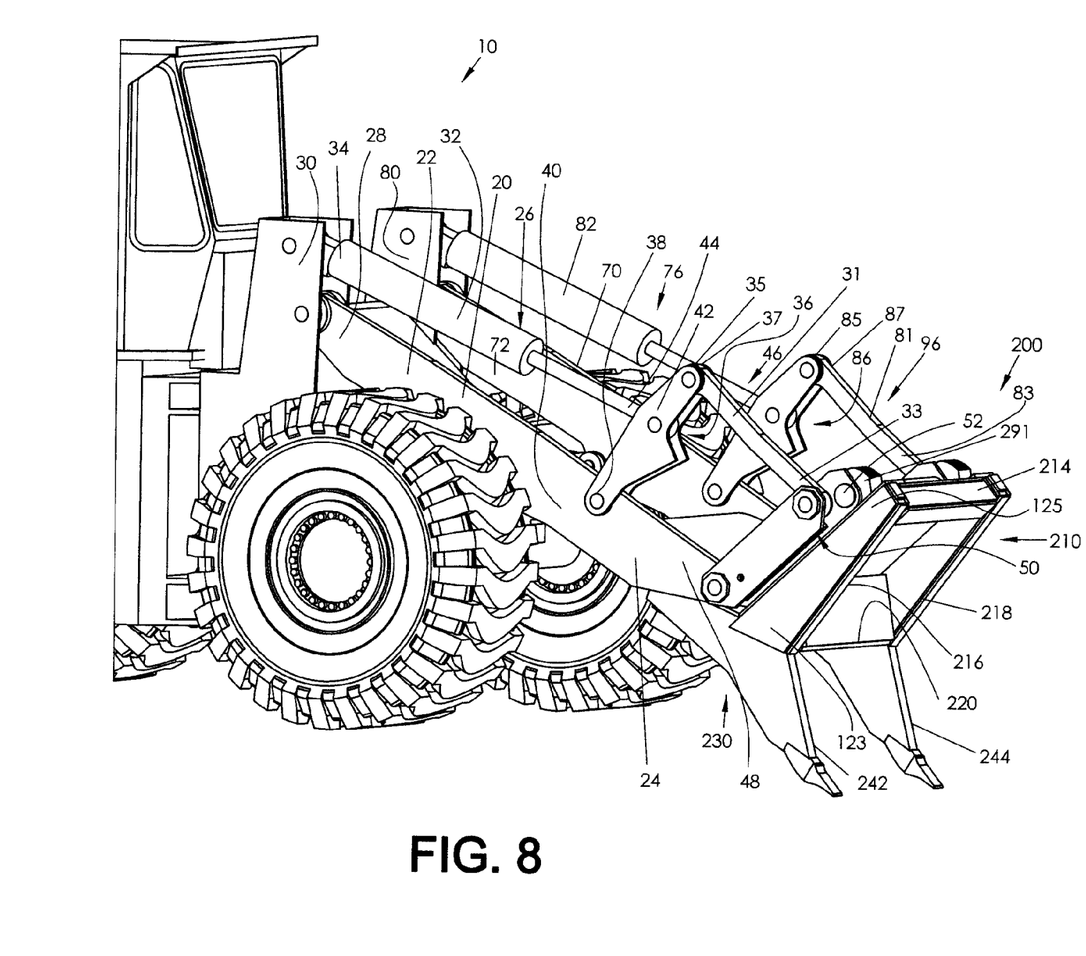
FIG. 8 is a front perspective view of a ripper apparatus of the present disclosure attached to a loader and including a roll-under stop.
Figures 9A, 9B, 9C:
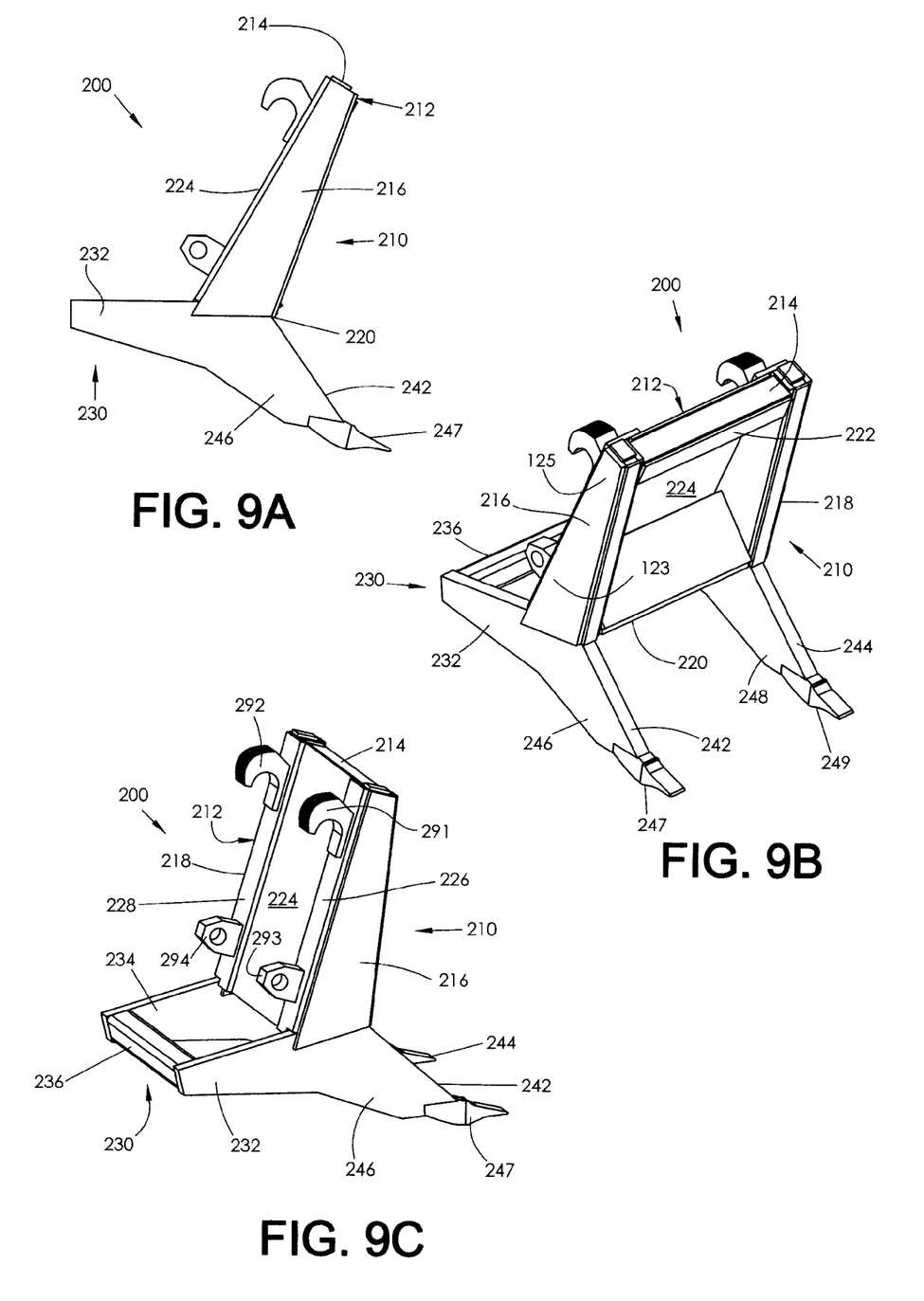
FIGS. 9A-9C are side elevation, front perspective, and rear perspective views of the ripper apparatus of FIG. 8, respectively.

In accordance with the present disclosure, there is also provided a ripper implement or apparatus for ripping objects from the ground, which is attachable to a loader or other machine. FIG. 8 is a front perspective view of the ripper apparatus 200 attached to a loader 10; and FIGS. 9A-9C are side elevation, front perspective, and rear perspective views of the ripper apparatus 200 of FIG. 8, respectively. The ripper 200 may be operatively connected to the loader 10 in substantially the same manner as the ground clearing apparatus 100 and 101 of FIGS. 1-6. The details of the connection of the ripper 200 to the loader 10, and the operation of the ripper 200 will be described subsequently herein. First, however, details of the ripper 200 will be described with reference to FIGS. 8-9C.

The ripper implement 200 is comprised of a box member 210 and at least two ripper teeth 242 and 244 extending downwardly and outwardly from the box member 210. In another embodiment (not shown) provided for smaller loaders and other driving machines, the ripper implement may be comprised of only a single ripper tooth. The box member 210 is comprised of a framework 212 having a perimeter comprised of an upper edge 214, first and second side edges 216 and 218, and a lower edge 220. In performing ripping operations, the box member 210 is subjected to high stresses, impacts, and shock loads, and is thus made of high strength materials, such as e.g., structural steel tubes, channels, I-beams, angles, and/or plates. The box member 210 is preferably of welded construction. In one embodiment, the upper edge 214 may be formed by a heavy wall square steel tubing member 222. The first and second side edge 216 and 218, and the lower edge 220 may be formed by welding plates together to form boxed structures. A substantially rectangular-shaped back plate 224 and/or a front plate (not shown) may be welded to the framework 212 to provide additional rigidity. The rearward surfaces 226 and 228 of the framework 212 provide attachment locations for connection of the ripper 200 to a loader or other machine as will be explained subsequently. It will be apparent that other structural members and arrangements could be used to form the box member 210 of the ripper 200.

The ripper teeth 242 and 244 extend downwardly and outwardly from the box member 210 as shown, in order to provide substantial leverage when using the ripper 210 to dislodge and rip objects from the ground. In one embodiment, the ripper teeth 242 may be of two piece construction, and are comprised of respective elongated bars 246 and 248, and removable tooth members 247 and 249, which may be joined to their respective elongated bar 246/248 by one or more suitable fasteners (not shown).

The ripper 200 may further include a roll-under stop 230, which extends backwardly from the lower edge 220 of the framework 212. The stop 230 may be comprised of a first plate or boxed section 232 and second plate or boxed section 234. The first plate 232 may be joined to the second plate 234 by a cross member 236, which may be made of e.g., square tubing. The first plate 232 may be formed integrally with the first tooth elongated bar 246 as a unitary structure. In like manner, the second plate 234 may be formed integrally with the second tooth elongated bar 248 as a unitary structure.

Figure 10A:
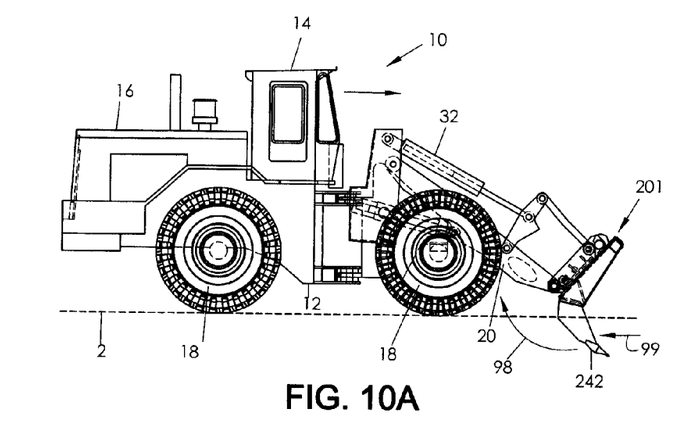
FIG. 10A is a side elevation view of a ripper apparatus lacking a roll-under stop, shown attached to a loader in an operational position ripping into the ground.
Figure 10B:
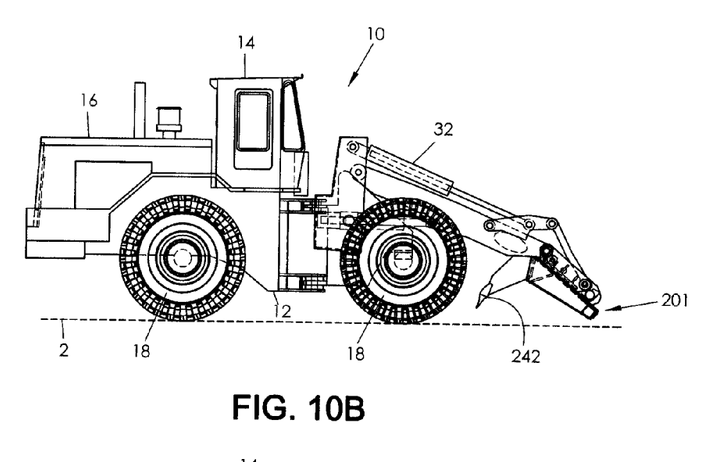
FIG. 10B is a side elevation view of the ripper apparatus of FIG. 10A shown attached to a loader and in a rolled-under position due to the lack of a roll-under stop.
Figure 10C:
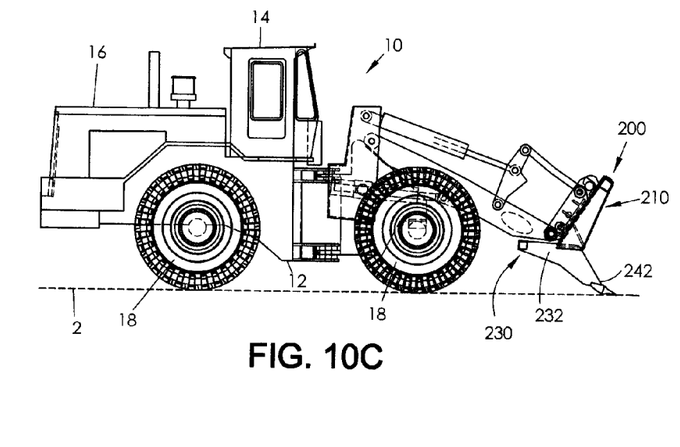
FIG. 10C is a side elevation view of the ripper apparatus of FIGS. 9A-9C shown attached to a loader in an operational position just above the ground surface.
Figure 10D:
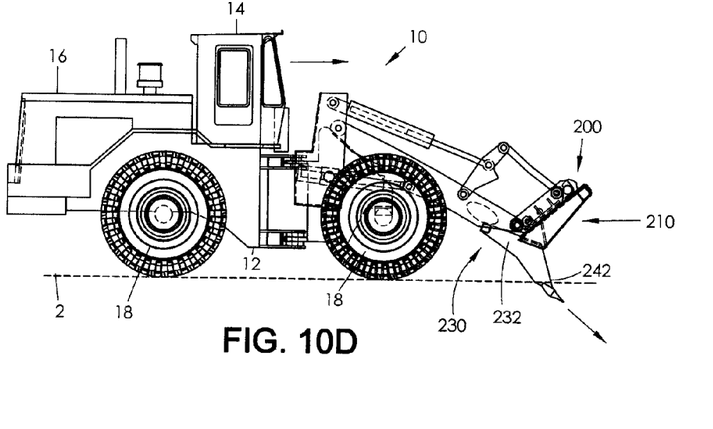
FIG. 10D is a side elevation view of the ripper apparatus of FIGS. 9A-9C shown attached to a loader in an operational position just below the ground surface, at the beginning of a ripping operation.

Referring to FIG. 8, when the ripper 200 is attached to a pair of elongated arms 20 and 70, which are attached to a loader 10, the roll-under stop 230 contacts the respective arms 20 and 70, thereby preventing the ripper teeth 242 and 244 from rolling under the box member 210. This is best understood by reference to FIGS. 10A-10D. Referring first to FIG. 10A, a loader 10 is depicted having forced a ripper 201 deep into the ground 2 to be cleared. The ripper 201 is not provided with a roll-under stop. The ground 2 applies a high resistance force, as indicated by arrow 99, to the teeth 242 of the ripper 201. Since no roll-under stop is provided on ripper 201, the only resistance that prevents the ripper 201 from rolling under, as indicated by arcuate arrow 98, are the hydraulic cylinders 32 that are operatively connected to the ripper 201. Since such hydraulic cylinders 32 are typically provided with pressure relief as a safety measure, they may not provide sufficient resistance to roll-under of the ripper 201. Referring to FIG. 10B, it can be seen that the ripper 201 has rolled under as a result of the force of the ground 2, and the lack of resistance by the hydraulic cylinders 32. Thus the lack of a roll-under stop limits the force that the ripper 201 can apply to the ground 2 to the relative resistance of the hydraulic cylinders 32 to roll-under. In contrast, the ripper 200 of FIGS. 10C and 10D is provided with a roll-under stop 230, which contacts the arms 20 and 70 (FIG. 8), thereby preventing roll-under of the ripper 200 when it is driven deeply and forcefully into the ground 2. The ripper 200 with the roll-under stop 230 is thus capable of much higher ripping forces than the ripper 201.

The apparatus 100, 101, or 200 of the present disclosure may be operatively connected to a tractor, a loader, a bulldozer, or a skid-steer. The specific configuration of features on the apparatus to make such a connection will depend upon the particular machine to which the apparatus is being connected. The details of the connection of the ground clearing apparatus 100 to a loader 10, and the operation of the apparatus 100 therewith will be now be described. Adaptation of the apparatus 100 to other machines will be apparent to those skilled in the art in view of the present disclosure. Additionally, the ripper apparatus 200 is connectable to a loader 100 in substantially the same manner as the ground clearing apparatus 100. Thus the following description also applies to the ripper apparatus 200; accordingly, reference may also be made to FIG. 8 in the following description.

Figure 7A:
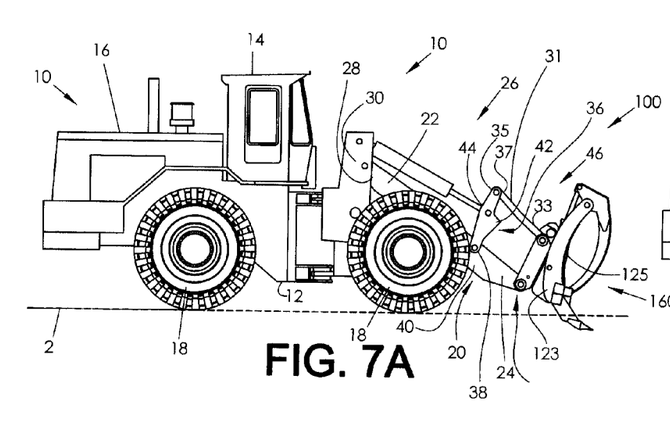
FIGS. 7A-7D are side elevation views of the ground clearing apparatus of FIGS. 1-5B shown attached to a loader, and in various operational positions.
Figure 7B:
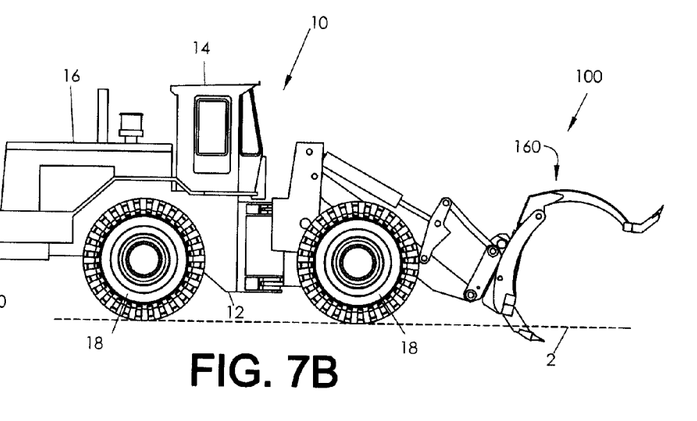
Figure 7C:
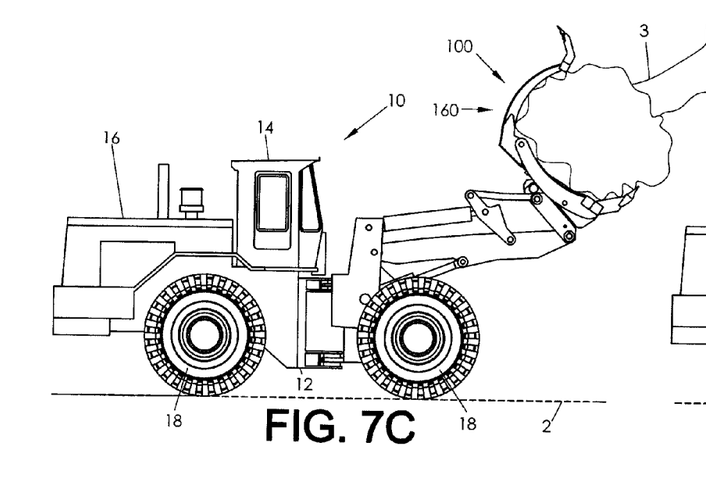
Figure 7D:
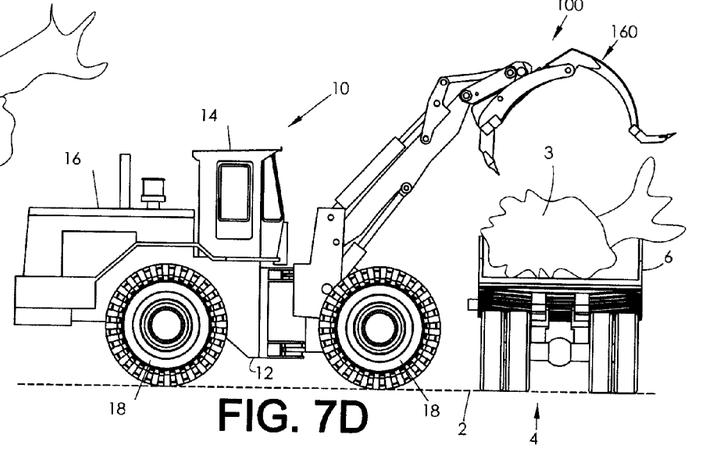

FIGS. 7A-7D are side elevation views of the ground clearing apparatus 100 of FIGS. 1-5B shown attached to a loader 10, and in various operational positions. The loader 10 is comprised of a frame 12, a cab 14, an engine contained within a housing 16, and driven wheels 18. In FIG. 7A, the grapple 160 is closed, and the apparatus 100 may be used to perform fine raking. In FIG. 7B, the grapple 160 is open, and the apparatus 100 may be used to perform coarse raking. In a coarse raking operation, the apparatus 100 is used to rake larger debris, and to loosen soil and bust clumps of dirt into smaller clumps, which will pass through a fine rake, if a fine raking operation is needed. In FIG. 7C, the grapple 160 is engaged with a large stump 3, and apparatus 100 is being used to remove the stump 3 to a remote location. In FIG. 7D, the apparatus 100 has been rotated downwardly, and the grapple 160 has released the stump 3 into the dump box 6 of a truck 4.

Referring to FIG. 7A, as well as FIGS. 1, 2, 4, and 8, to render the apparatus 100 operable by the loader 10, the apparatus 100 may be further comprised of a pair of first and second support arms 20 and 70. The first support arm 20 is comprised of a proximal portion 22 and a distal portion 24. In like manner, the second support arm 70 is comprised of a proximal portion and a distal portion. The proximal portion 22 of the first support arm 20 is a first member of a first four member box linkage 26, which further comprises second, third, and fourth members. The first support arm 20 is hingeably attached at a proximal end 28 thereof to the second member of the first box linkage 26, which comprises a first fixed length frame member 30. The first frame member 30 is joined to the frame 12 of the loader 10. The third member of the first box linkage 26 is comprised of a first variable length linear actuator 32 hingeably attached at a proximal end 34 thereof to the second member 30. The first variable length linear actuator 32 may be a hydraulic cylinder. The fourth member of the first box linkage 26 is comprised of a first fixed length bar member 36 hingeably attached at a lower end 38 thereof to a distal end 40 of the proximal portion 22 of the first support arm 20, and hingeably attached at a central region 42 thereof to a distal end 44 of the third member 32 of the first box linkage 26.

A second four member box linkage 76 is provided, which is substantially identical to the first four member box linkage 26. The second four member box linkage 76 includes the proximal region of the second support arm 70. The first four member box linkage 26 and the second four member box linkage are right and left hand versions of substantially the same type of linkage. The proximal portion 72 of the second support arm 70 is a first member of the second four member box linkage 76, which further comprises second, third, and fourth members. The second support arm 70 is hingeably attached at a proximal end thereof to the second member of the second box linkage 76, which comprises a second fixed length frame member 80. The second frame member 80 is joined to the frame 12 of the loader 10. The third member of the second box linkage 76 is comprised of a second variable length linear actuator 82 hingeably attached at a proximal end thereof to the second fixed length frame member 80. The second variable length linear actuator 82 may be a hydraulic cylinder. The fourth member of the second box linkage 76 is comprised of a second fixed length bar member 86 hingeably attached at a lower end thereof to a distal end of the proximal portion of the second support arm 70, and hingeably attached at a central region thereof to a distal end of the third member 82 of the second box linkage 76.

The distal portion 24 of the first support arm 20 is a first member of a third four member box linkage 46, which further comprises second, third, and fourth members. The first support arm 20 is hingeably attached at a distal end 48 thereof to a lower region 123 of the box member 110 of the apparatus 100, or the box member 210 of the ripper 200. The box member 110 or 210 forms the second member of the third box linkage 46. The third member of the third box linkage 46 is comprised of a third fixed length bar member 31 hingeably attached at a distal end 33 thereof to an upper region 125 of the box member. The fourth member of the third box linkage 46 is comprised of the fourth member 36 of the first box linkage 26 hingeably attached at an upper end 35 thereof to a proximal end 37 of the third member 31 of the third box linkage 46.

A fourth four member box linkage 96 is provided, which is substantially identical to the third four member box linkage 46. The fourth four member box linkage 96 includes the distal region of the second support arm 70. The third four member box linkage 46 and the fourth four member box linkage 96 are right and left hand versions of substantially the same type of linkage. The distal portion of the second support arm 70 is a first member of the fourth four member box linkage 96, which further comprises second, third, and fourth members. The second support arm 70 is hingeably attached at a distal end thereof to a lower region 123 of the box member 110 of the apparatus 100, or the box member 210 of the ripper 200. The box member 110 or 210 forms the second member of the fourth box linkage 96. The third member of the fourth box linkage 96 is comprised of a fourth fixed length bar member 81 hingeably attached at a distal end 83 thereof to the upper region 125 of the box member. The fourth member of the fourth box linkage 96 is comprised of the fourth member 86 of the second box linkage 76 hingeably attached at an upper end 85 thereof to a proximal end 87 of the third member 81 of the fourth box linkage 96.

Referring again to FIG. 8, and in another embodiment, a first cross member (not shown) may be joined to and extend between the upper portions of the first and second frame members 30 and 80, and a second cross member (not shown) may be joined to and extend between the central regions of the first and second fixed length bar members 36 and 86. In such a configuration, the first and second variable length linear actuators 32 and 82 may be replaced by a single variable length linear actuator (not shown) operatively connected to the first and second cross members.

The ground clearing apparatus 100 or the ripper 200 may be directly connected to the first and second support arms 20 and 70, with the respective box members 110 and 210 thereof forming the second members of the third and fourth box linkages 46 and 96. However, in the embodiments depicted in FIGS. 1-10D, an adapter member is used in the third and fourth box linkages 46 and 96. The ground clearing apparatus 100 and the ripper 200 are provided with features to easily couple them to the adapter member. In that manner, changeover between the ground clearing apparatus 100 and the ripper 200, and/or other implements similarly configured can be rapidly accomplished.

This capability is best understood with reference to FIGS. 3A, 3B, 9A, 9C, and 8. Referring first to FIGS. 3A and 3B, apparatus 100 is provided with a pair of mounting hooks 191 and 192, and a pair of mounting ears 193 and 194 on the rearward side thereof. Referring also to FIGS. 9A and 9C, and in like manner, ripper 200 is provided with a pair of mounting hooks 291 and 292, and a pair of mounting ears 293 and 294 on the rearward side thereof. Referring also to FIG. 8, the ripper 200 is coupled to an adapter member 50 which is comprised of an upper cross bar 52, and lower mounting tabs (not shown). The first and second mounting hooks 291 and 292 engage with the upper cross bar 52. Pins or bolts (not shown) may be used to connect the pair of mounting ears 293 and 294 of the ripper 200 to the lower mounting tabs, to completely secure the ripper 200 to the adapter member 50 and render it operational with the loader 10. The ground clearing apparatus 100 is coupled to the adapter member 50 and loader 10 in substantially the same manner.

Figure 11A:
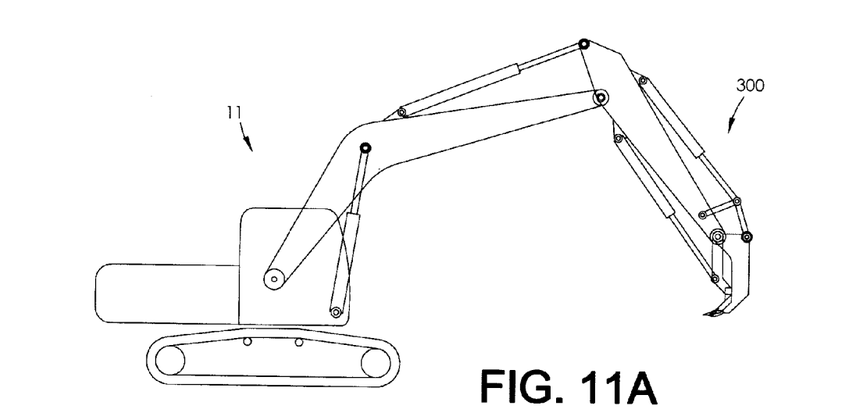
FIG. 11A is a side elevation view of an excavator-type ground clearing and digging apparatus of the present disclosure.
Figure 11B:
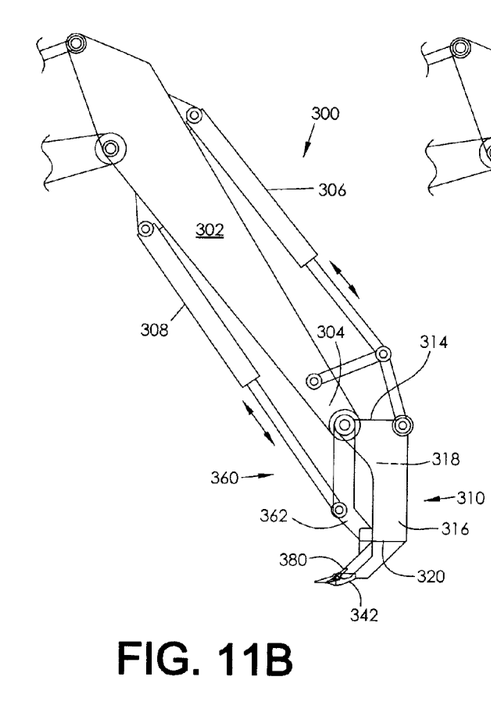
FIG. 11B is a detailed side elevation view of the excavator implement of FIG. 11A, shown in the closed position.
Figure 11C:
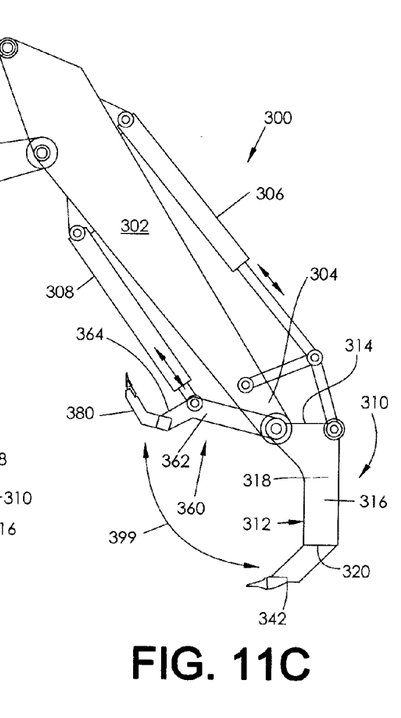
FIG. 11C is a detailed side elevation view of the excavator implement of FIG. 11A, shown in the open position.

In accordance with the present disclosure, there is also provided an excavator implement or apparatus for excavating within ground, for ripping objects from the ground, and for raking areas of ground. The apparatus may be attached to a tractor, a bulldozer, a loader, a skid steer, or another suitable machine, and used in a manner similar to that of a backhoe or shovel. FIG. 11A is a side elevation view of an excavating machine including the excavating apparatus 300 of the present disclosure. FIG. 11B is a detailed side elevation view of the excavator apparatus 300 of FIG. 11A, shown in the closed position, and FIG. 11C is a detailed side elevation view of the excavator apparatus 300 of FIG. 11A, shown in the open position. Apparatus 300 is comprised of a box member 310 and a grapple 360. The box member 310 is comprised of a framework 312 similar to the ground clearing apparatus 100 and the ripper 200, and comprising an upper edge 314, first and second side edges 316 and 318, and a lower edge 320. In performing ground clearing operations, the box member 310 is subjected to high stresses, impacts, and shock loads, and is thus made of high strength materials, such as e.g., structural steel members. The box member 310 is further comprised of a plurality of excavating teeth 342 protruding downwardly from the lower edge 320. The base teeth 342 may be disposed at substantially regular intervals along the lower edge 320, and may be used in the coarse raking of ground when clearing ground with the excavator 11 instead of a wheel loader 10. The box member 310 is hingeably attached to an articulating arm 302, and is pivotable around the end 304 of the arm by a hydraulic cylinder 306.

The grapple 360 is comprised of a grapple arm 362 hingeably attached to the end 304 of the articulating arm 302. The grapple arm 362 is pivotable around the end 304 of the arm by a hydraulic cylinder 308 as indicated by arcuate arrow 399. The grapple 360 is further comprised of a plurality of grapple teeth 380 extending outwardly from the distal end 364 of the grapple arm 362. These grapple teeth 380 serve to provide the excavating apparatus 300 with fine raking and clawing capability in much the same manner as was described for the ground clearing apparatus 100 of FIGS. 1-5B.

It is, therefore, apparent that there has been provided, in accordance with the present invention, a ground clearing apparatus for extracting and separating rocks, and roots, stumps, and other vegetation components from soil. Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

We claim:

1. A ground clearing apparatus comprising:
 a. a box member comprised of a framework having a perimeter comprised of an upper edge, first and second side edges, and a lower edge; a plurality of base teeth protruding downwardly from the lower edge; a first hinge ear joined to the framework proximate to the upper edge and first side edge; and a second hinge ear joined to the framework proximate to the upper edge and second side edge; and
 b. a grapple comprised of a first grapple arm hingeably attached to the first hinge ear of the box member; a second grapple arm hingeably attached to the second hinge ear of the box member; and a cross member joined to a distal end of the first grapple arm and to a distal end of the second grapple arm, and a plurality of grapple teeth extending outwardly from the cross member, the grapple being movable from a closed position in which the cross member is proximate to the lower edge of the box member to an open position;

wherein the grapple teeth are interspersed with the base teeth when the grapple is in the closed position.

2. The apparatus as recited in claim 1, wherein the box member is comprised of a forward surface bounded by the perimeter and comprising a plurality of openings therethrough.

3. The apparatus as recited in claim 2, wherein the box member is further comprised of a grating formed in the framework and comprising the forward surface, and wherein the plurality of openings form a grid in the forward surface.

4. The apparatus as recited in claim 1, wherein the number of grapple teeth are substantially equal to the number of base teeth.

5. The apparatus as recited in claim 1, wherein the number of grapple teeth are between about one and about three times the number of base teeth.

6. The apparatus as recited in claim 1, wherein the grapple teeth are substantially equally spaced between the base teeth when the grapple is in the closed position.

7. The apparatus as recited in claim 1, wherein the grapple is comprised of a first linear actuator operatively connected to the first grapple arm and to the box member, and a second linear actuator operatively connected to the second grapple arm and to the box member.

8. The apparatus as recited in claim 1, further comprising first and second mounting hooks and first and second mounting ears joined to a rearward side of the framework and configured to engage with an adapter member comprised of an upper cross bar and first and second lower mounting tabs.

9. A ground clearing apparatus comprising:
a. a box member comprised of a framework having a perimeter comprised of an upper edge, first and second side edges, and a lower edge; a plurality of base teeth protruding downwardly from the lower edge; a first hinge ear joined to the framework proximate to the upper edge and first side edge; and a second hinge ear joined to the framework proximate to the upper edge and second side edge;
b. a grapple comprised of a first grapple arm hingeably attached to the first hinge ear of the box member; a second grapple arm hingeably attached to the second hinge ear of the box member; and a cross member joined to a distal end of the first grapple arm and to a distal end of the second grapple arm, and a plurality of grapple teeth extending outwardly from the cross member, the grapple being movable from a closed position in which the cross member is proximate to the lower edge of the box member to an open position; and
c. a pair of first and second support arms, each of first and second support arms comprising a proximal portion and a distal portion, wherein:
i. the proximal portion of the first support arm is a first member of a first four member box linkage, the first four member box linkage further comprising second, third, and fourth members, wherein:
the first support arm is hingeably attached at a proximal end thereof to the second member of the first box linkage, which comprises a first fixed length frame member;
the third member of the first box linkage is comprised of a first variable length linear actuator hingeably attached at a proximal end thereof to the second member;
the fourth member of the first box linkage is comprised of a first fixed length bar member hingeably attached at a lower end thereof to a distal end of the proximal portion of the first support arm, and hingeably attached at a central region thereof to a distal end of the third member of the first box linkage;
ii. the proximal portion of the second support arm is a first member of a second four member box linkage, the second four member box linkage further comprising second, third, and fourth members, wherein:
the second support arm is hingeably attached at a proximal end thereof to the second member of the second box linkage, which comprises a second fixed length frame member;
the third member of the second box linkage is comprised of a second variable length linear actuator hingeably attached at a proximal end thereof to the second member of the second box linkage;
the fourth member of the second box linkage is comprised of a second fixed length bar member hingeably attached at a lower end thereof to a distal end of the proximal portion of the second support arm, and hingeably attached at a central region thereof to a distal end of the third member of the second box linkage;
iii. the distal portion of the first support arm is a first member of a third four member box linkage, the third four member box linkage further comprising second, third, and fourth members, wherein:
the first support arm is hingeably attached at a distal end thereof to a lower region of the box member, the box member forming the second member of the third box linkage;
the third member of the third box linkage is comprised of a third fixed length bar member hingeably attached at a distal end thereof to an upper region of the box member;
the fourth member of the third box linkage is comprised of the fourth member of the first box linkage hingeably attached at an upper end thereof to a proximal end of the third member of the third box linkage; and
iv. the distal portion of the second support arm is a first member of a fourth four member box linkage, the fourth four member box linkage further comprising second, third, and fourth members, wherein:
the second support arm is hingeably attached at a distal end thereof to the lower region of the box member, the box member forming the second member of the fourth box linkage;
the third member of the fourth box linkage is comprised of a fourth fixed length bar member hingeably attached at a distal end thereof to the upper region of the box member;
the fourth member of the fourth box linkage is comprised of the fourth member of the second box linkage hingeably attached at an upper end thereof to a proximal end of the third member of the fourth box linkage;

wherein the grapple teeth are interspersed with the base teeth when the grapple is in the closed position.

10. The apparatus as recited in claim 9, wherein the box member is comprised of a forward surface bounded by the perimeter and comprising a plurality of openings therethrough.

11. The apparatus as recited in claim 10, wherein the box member is further comprised of a grating formed in the framework and comprising the forward surface, and wherein the plurality of openings form a grid in the forward surface.

12. The apparatus as recited in claim 9, wherein the number of grapple teeth are substantially equal to the number of base teeth.

13. The apparatus as recited in claim 9, wherein the number of grapple teeth are between about one and about three times the number of base teeth.

14. The apparatus as recited in claim 9, wherein the grapple teeth are substantially equally spaced between the base teeth when the grapple is in the closed position.

15. The apparatus as recited in claim 9, wherein the grapple is comprised of a first linear actuator operatively connected to the first grapple arm and to the box member, and a second linear actuator operatively connected to the second grapple arm and to the box member.

16. The apparatus as recited in claim 9, wherein the first and second fixed length frame members are joined to one of a tractor, a loader, a bulldozer, and a skid-steer.

17. The apparatus as recited in claim 9, further comprising first and second mounting hooks and first and second mounting ears joined to a rearward side of the framework and configured to engage with an adapter member comprised of an upper cross bar and first and second lower mounting tabs.

* * * * *